United States Patent [19]

Vanmoor

[11] Patent Number: 5,778,062
[45] Date of Patent: Jul. 7, 1998

[54] VOICE REFLECTOR FOR A COMMUNICATION DEVICE, IN PARTICULAR A CELLULAR TELEPHONE

[76] Inventor: Arthur Vanmoor, 18761 W. Dixie Hwy. #209, North Miami Beach, Fla. 33180

[21] Appl. No.: 654,532

[22] Filed: May 29, 1996

[51] Int. Cl.$^6$ .................................................. H04M 1/00
[52] U.S. Cl. .................... 339/428; 379/447; 379/451; 379/433; 455/551
[58] Field of Search .................... 379/447, 451, 379/433, 428, 441, 452, 443, 444, 439; 381/157, 160, 158; 181/242, 241, 175; D14/138; 455/551, 550

[56] References Cited

U.S. PATENT DOCUMENTS

| | | | |
|---|---|---|---|
| D. 305,027 | 12/1989 | Catey et al. | 379/452 |
| D. 307,753 | 5/1990 | Oliver | 379/452 |
| D. 338,199 | 8/1993 | Andrew | D14/138 |
| D. 338,675 | 8/1993 | Wharton et al. | 379/439 |
| 1,537,886 | 5/1925 | Sackl | 379/452 |
| 1,797,891 | 3/1931 | Young | 381/160 |
| 2,245,724 | 6/1941 | Scher | 181/242 |
| 2,313,383 | 3/1943 | Kolodny | 379/452 |
| 2,425,061 | 8/1947 | Hart | 379/441 |
| 2,826,649 | 3/1958 | Desbrow | 181/242 |
| 4,483,414 | 11/1984 | Tanaka | 381/158 |
| 4,823,384 | 4/1989 | Lindsay | 379/447 |
| 4,905,276 | 2/1990 | Catey et al. | 379/447 |
| 5,034,979 | 7/1991 | Erickson | 379/447 |
| 5,136,639 | 8/1992 | Brito | 379/452 |
| 5,257,310 | 10/1993 | Takagi et al. | 379/433 |
| 5,357,570 | 10/1994 | Tomura et al. | 379/428 |

*Primary Examiner*—Dwayne Bost
*Assistant Examiner*—Keith Ferguson
*Attorney, Agent, or Firm*—Herbert L. Lerner; Laurence A. Greenberg

[57] ABSTRACT

In combination with a cellular telephone having a microphone, a voice reflector includes a cap attached to the cellular telephone. The cap has an inner surface defining a reflection region for reflecting sound waves into the microphone of the cellular telephone. The cap may be integrally connected to the cellular telephone or the voice reflector may include fasteners to connect the cap to the cellular telephone. In combination with a cellular flip telephone having a microphone and a lid, another embodiment of a voice reflector according to the invention includes a jalousie attached to the lid of the cellular flip telephone for reflecting sound waves of a voice into the microphone of the cellular telephone.

17 Claims, 4 Drawing Sheets

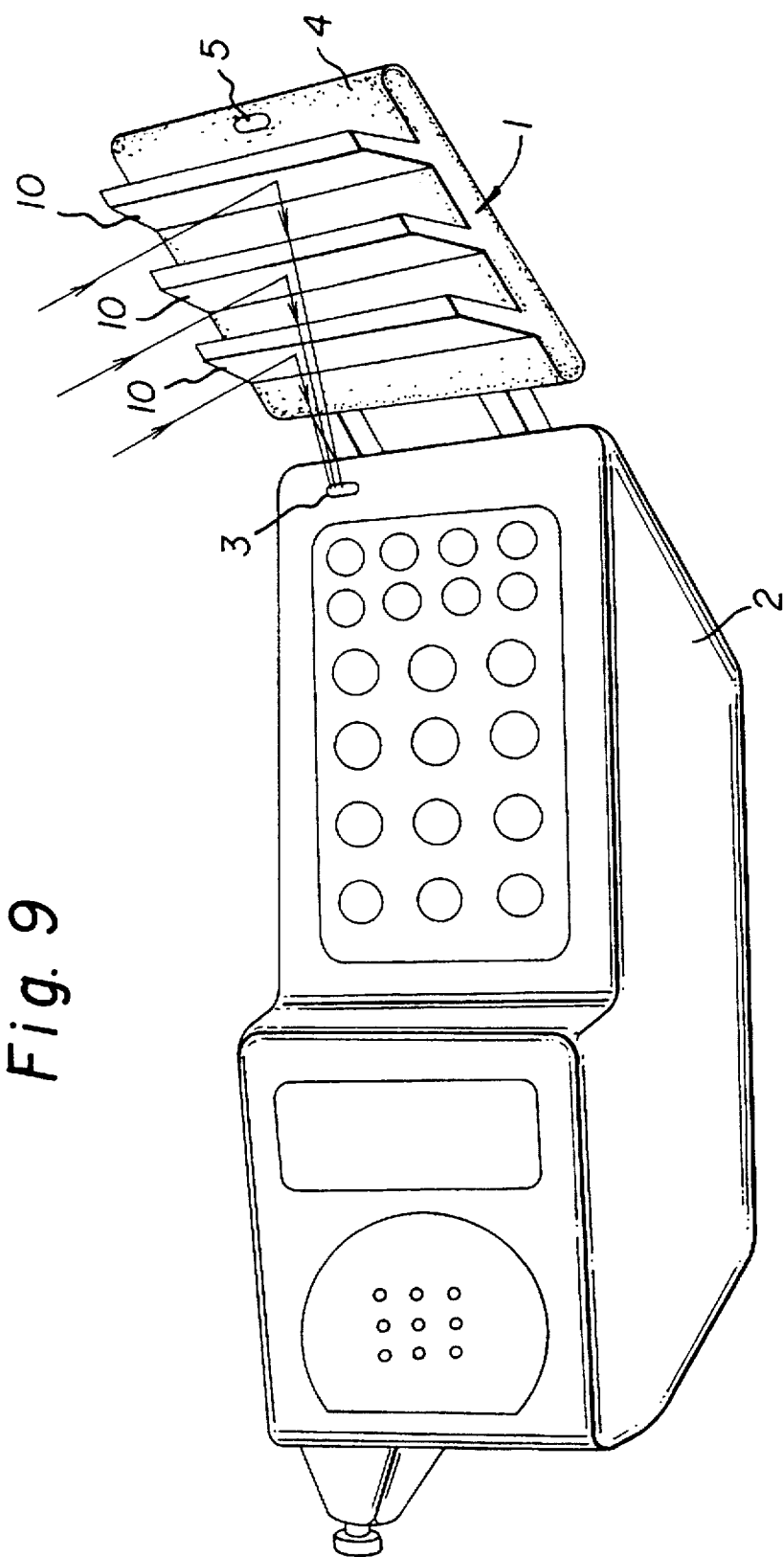

VOICE REFLECTOR FOR A COMMUNICATION DEVICE, IN PARTICULAR A CELLULAR TELEPHONE

BACKGROUND OF THE INVENTION

1. Field of the Invention

The invention relates to an attachment for a communication device, in particular a cellular telephone.

2. Description of the Related Art

Cellular telephones are often small and short. Consequently, the microphone on the cellular telephone is often next to a speaker's cheek rather than mouth if the receiver on the cellular telephone is held against the speaker's ear. The microphone only picks-up a fraction of the sound waves from the speaker's voice as a result. Additionally, cellular telephone microphones are often sensitive to compensate for the lack of proximity to the speaker's mouth, so they pick-up background noise.

The microphone on a cellular flip telephone is also typically next to a speaker's cheek rather than mouth. Such flip cellular telephones appear to have a microphone on the flip lid, but actually the microphone is on the main body of the cellular telephone. Consequently, the microphones on cellular flip telephones also only pick-up a fraction of the sound waves from the speaker's voice.

Other communication devices with microphones also frequently lack proximity to a speaker's mouth, i.e. telephones, portable telephones, and walkie-talkies. The microphones on such communication devices also only pick-up a fraction of the sound waves from the speaker's mouth.

Although attachments for communication devices are known, such attachments do not overcome the aforementioned disadvantages. For example, U.S. Pat. No. 2,245,724 discloses a voice muffler for muffling the voice of a speaker desiring to converse confidentially in the presence of others on a "hand set" type of telephone. The muffler includes a transmitter engaging member, a domed mouthpiece supporting member and a mouthpiece, which are molded of hard rubber and are substantially rigid and non-deformable. Additionally, the muffler includes a sound absorbing unit to muffle sound. In use, the mouth of the speaker is pressed against the rim of the mouthpiece to prevent escape of sound being directed to the transmitter.

Another known attachment for a communication device is disclosed in U.S. Pat. No. 2,425,061. That telephone attachment is for excluding extraneous noises from the microphone of a telephone instrument. When the user of the telephone is not talking, all sound may be excluded from the microphone of the telephone by closing a shutter. When the user is speaking, the shutter is opened so that the microphone picks-up sound.

SUMMARY OF THE INVENTION

It is accordingly an object of the invention to provide a voice reflector for a communication device, in particular a cellular telephone, which overcomes the above-mentioned disadvantages of the heretofore-known devices and methods of this general type and which reflects sound waves into a microphone on the communication device.

With the foregoing and other objects in view there is provided, in accordance with the invention, in combination with a cellular telephone having a microphone, a voice reflector, comprising: a cap attached to the cellular telephone, the cap having an inner surface defining a reflection region for reflecting sound waves into the microphone of the cellular telephone.

In accordance with an added feature of the invention, the cap is formed of a flexible material.

In accordance with an additional feature of the invention, the inner surface of the cap is concave.

In accordance with another feature of the invention, the cellular telephone has lateral surfaces and the cap includes two wings attached to the lateral surfaces of the cellular telephone.

In accordance with a further feature of the invention, the cap is integrally connected to the cellular telephone.

In accordance with again an added feature of the invention, the voice reflector includes fasteners disposed on the inner surface of the cap for connecting the cap to the cellular telephone.

In accordance with again an additional feature of the invention, the fasteners are hook and loop fasteners or the fasteners are adhesive tape.

In accordance with again another feature of the invention, the cellular telephone has lateral surfaces with grooves formed therein, the fasteners being tongues engaging in the grooves formed in the cellular telephone.

In accordance with again a further feature of the invention, the cellular telephone has lateral surfaces with bores formed therein, the fasteners being hinges engaging with the bores formed in the cellular telephone.

In accordance with yet an added feature of the invention, the cellular telephone has an end proximal the microphone, the cap has lower edges, and including a pocket connected to the lower edges of the cap, the end of the cellular telephone protruding into the pocket.

In accordance with yet an additional feature of the invention, the pocket has an opening formed therein corresponding to the microphone of the cellular telephone for exposing the microphone to enhance transmission quality.

In accordance with yet another feature of the invention, the cap has creases formed therein for folding the cap when the cellular telephone is in storage.

In accordance with yet a further feature of the invention, the cellular telephone has an end proximal the microphone, the cap has lower edges, and including an extender connected to the lower edges of the cap for positioning the cap proximal to a mouth of an operator, the end of the cellular telephone attaching to the extender.

In accordance with still an added feature of the invention, the cellular telephone is a cellular flip telephone.

With the objects of the invention in view, there is also provided, in combination with a communication device having a microphone, a voice reflector, comprising: a cap formed of a flexible material attached to the communication device, the cap having an inner surface defining a reflection region for reflecting sound waves of a voice into the microphone of the communication device.

With the objects of the invention in view, there is additionally provided, in combination with a cellular flip telephone having a microphone and a lid, a voice reflector, comprising: a jalousie attached to the lid of the cellular flip telephone for reflecting sound waves of a voice into the microphone of the cellular telephone.

In accordance with an added feature of the invention, the jalousie includes a plurality of baffles hingedly attached to the lid of the cellular flip telephone.

In accordance with an additional feature of the invention, the jalousie includes a plurality of flexible baffles attached to the lid of the cellular flip telephone.

Other features which are considered as characteristic for the invention are set forth in the appended claims.

Although the invention is illustrated and described herein as embodied in a voice reflector for a communication device, in particular a cellular telephone, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

BRIEF DESCRIPTION OF THE DRAWING

FIG. 9 is a perspective view of a seventh embodiment of the voice reflector attached to a cellular flip telephone along with arrows diagrammatically illustrating the reflection of sound waves.

DESCRIPTION OF THE PREFERRED EMBODIMENTS

Figure 1:
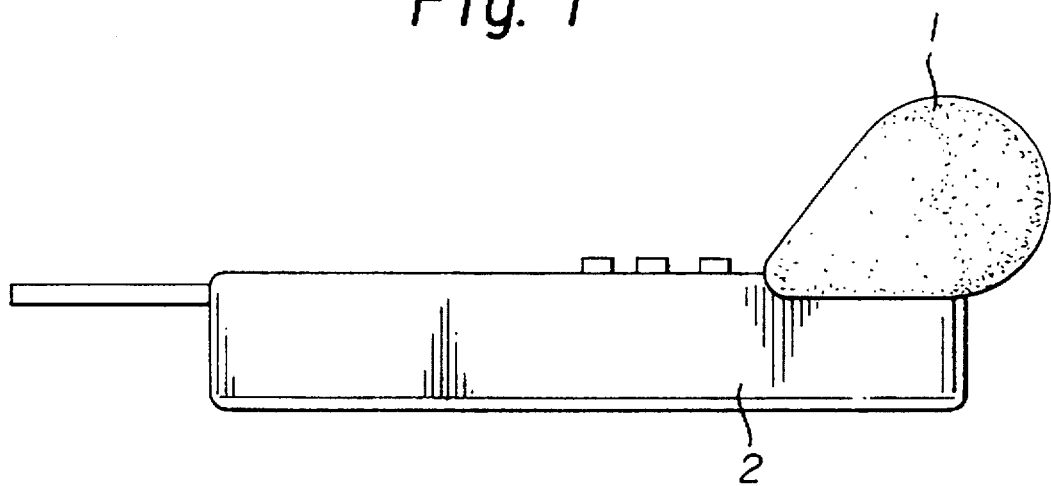
FIG. 1 is a diagrammatic, side-elevational view of a voice reflector according to the invention attached to a cellular telephone.
Figure 2:
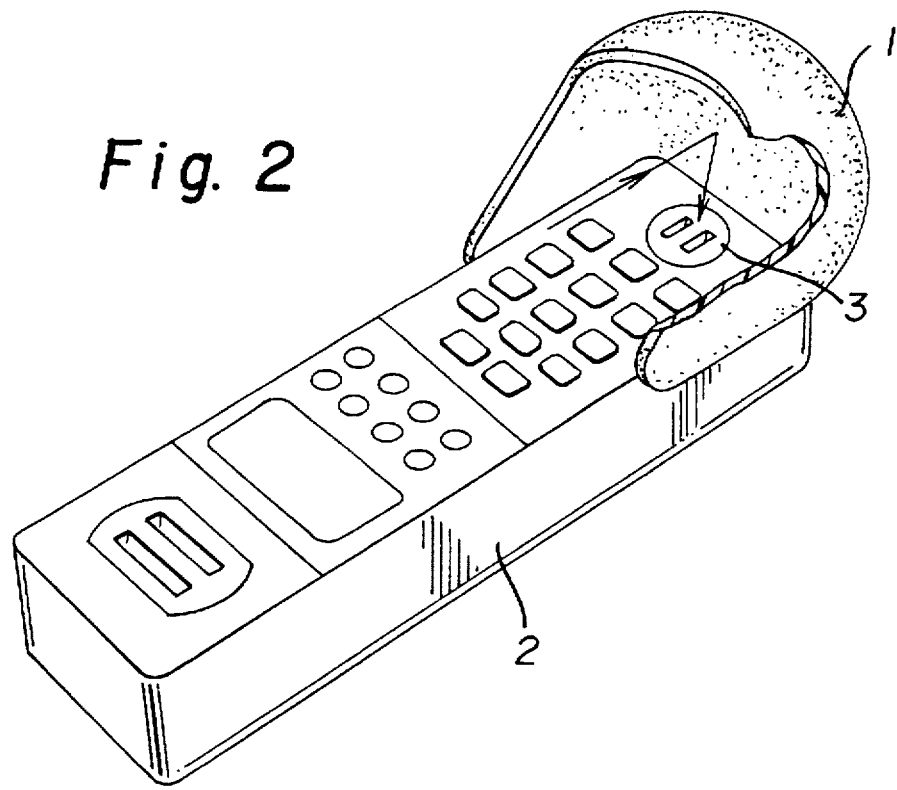
FIG. 2 is a partially broken away, perspective view of the voice reflector attached to a cellular telephone along with arrows diagrammatically illustrating the reflection of sound waves.

Referring now to the figures of the drawing in detail and first, particularly, to FIGS. 1 and 2 thereof, there is seen a voice reflector 1 attached to a cellular telephone 2. The voice reflector 1 reflects or redirects sounds waves of a voice into a microphone 3 on the cellular telephone 2. The reflector 1 is preferably made of a flexible material such as rubber or polyurethane so that the possessor of the cellular telephone 2 may still put the cellular telephone 2 in a pocket or purse with the voice reflector 1 attached. Alternatively, the reflector 1 is plastic such as polyethylene, PVC, etc.

FIGS. 3-7 illustrate five embodiments of the voice reflector 1 according to the invention. The voice reflector 1 is illustrated in the form of a hood or a cap 20. The inner surface of the cap 20 is a reflection region 30 which reflects sound waves into a microphone on the cellular telephone 2. The hood or cap 20 of the embodiments illustrated in FIGS. 3-7 also includes two wings 10 which attach to lateral surfaces of the cellular telephone 2.

Figure 3:
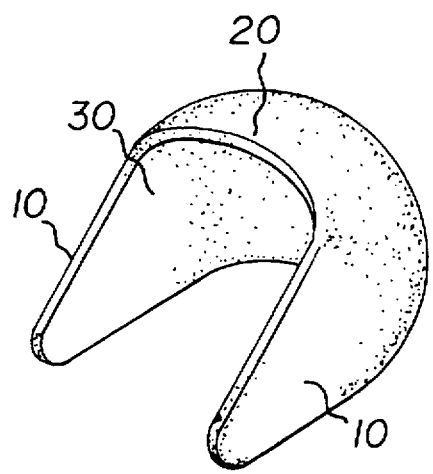
FIG. 3 is a perspective view of a first embodiment of the voice reflector.

A first embodiment of the voice reflector 1 is illustrated in FIG. 3. The voice reflector 1 connects with the cellular telephone 2 to redirect sound waves of a voice speaking into the cellular telephone 2. The cap 20 in the first embodiment integrally connects to the lateral surfaces of the cellular telephone 2. The cap 20 may be integrally connected to the cellular telephone 2 for example with glue or by heating the cap 20 and the sides of the cellular telephone 2 to fuse them together.

Figure 4:
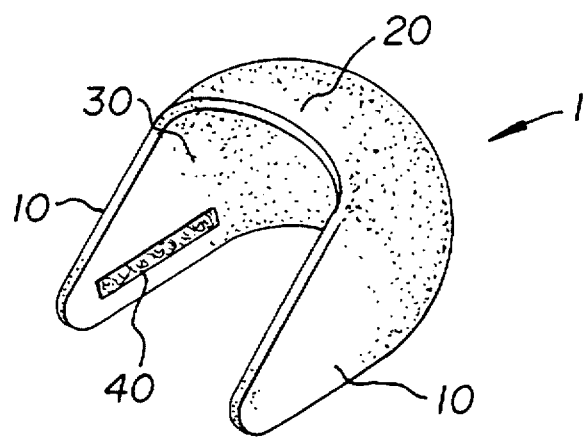
FIG. 4 is a perspective view of a second embodiment of the voice reflector with a Velcro® fastener.
Figure 5:
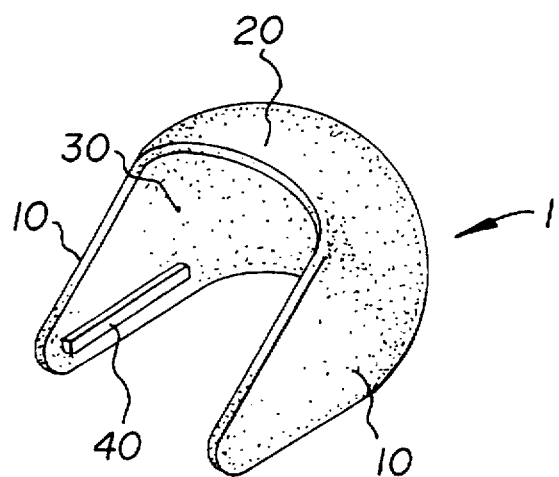
FIG. 5 is a perspective view of a third embodiment of the voice reflector with a tongue fastener.
Figure 6:
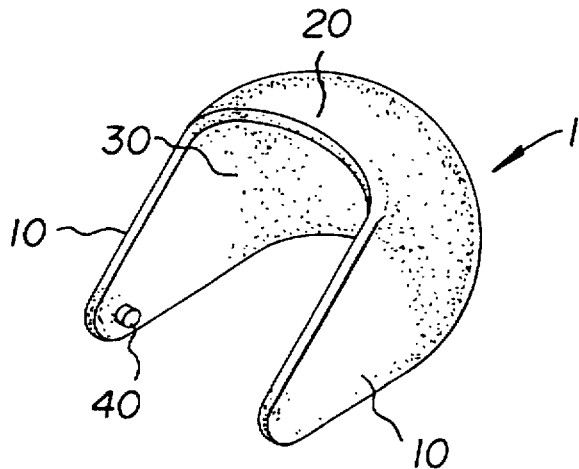
FIG. 6 is a perspective view of a fourth embodiment of the voice reflector with a hinge fastener.

FIGS. 4-6 illustrate additional embodiments of the voice reflector 1 in which the voice reflector 1 includes fasteners 40 to connect the cap 20 to the cellular telephone 2. An inner surface of each wing 10 of the cap 20 has a fastener 40 in these embodiments.

The fasteners 40 are Velcro® strips in FIG. 4. Velcro® fasteners have a loop strip and a hook strip. The fasteners 40 on the inner surface of each wing 10 of the voice reflector 1 may be either a loop strip or a hook strip. In this embodiment, the cellular telephone 2 must also have a Velcro® strip attached on each longitudinal side for engaging with the Velcro® strips on the voice reflector 1. The Velcro® strips on the cellular telephone 2 are of the corresponding type to the Velcro® strips on the voice reflector 1.

Alternatively, the fasteners 40 illustrated in FIG. 4 could be adhesive tape. If the fasteners are adhesive tape, only one double-sided strip of tape is required to connect the voice reflector 1 to the cellular telephone 2.

FIG. 5 illustrates a third embodiment of the voice reflector 1. The fasteners 40 are tongues formed on the wings 10 of the cap 20 for engaging in grooves on the cellular telephone in order to connect the voice reflector 1 with the cellular telephone 2.

A fourth embodiment of the voice reflector 1 is illustrated in FIG. 6. The fasteners 40 are hinges to be engaged with bores on the cellular telephone. The hinge on one wing 10 of the cap 20 protrudes into a bore on one side of the cellular telephone, whereas the hinge on the other wing 10 of the cap 20 protrudes into a bore on the opposite side of the cellular telephone.

Figure 7:
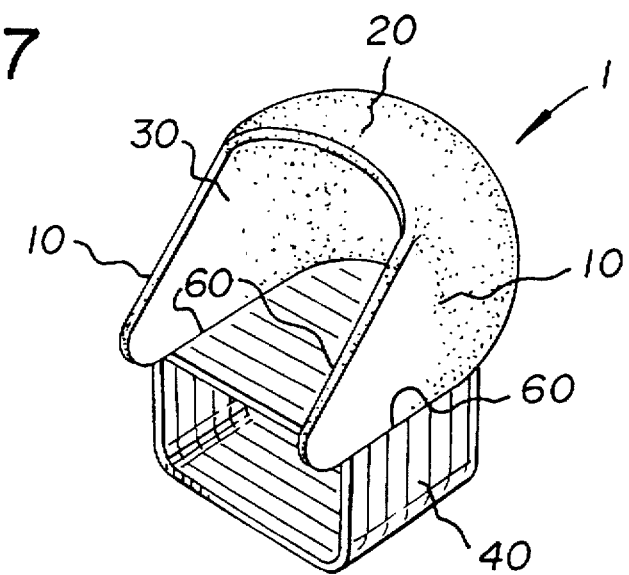
FIG. 7 is a perspective view of a fifth embodiment of the voice reflector with a pocket fastener.

FIG. 7 illustrates a fifth embodiment of the voice reflector 1 according to the invention. The fastener 40 is a pocket connected to lower edges 60 of the cap 20, which are proximal to the microphone 3 on the cellular telephone 2. An end of the cellular telephone 2 proximal the microphone protrudes into the pocket of the voice reflector 1. The fastener or pocket 40 may be made from any flexible material such as padded vinyl or leather. Additionally, the pocket 40 may be elastic to permit connection with cellular telephones of various sizes. For example, the pocket could fit over a lid 4 of a cellular flip telephone, illustrated in FIG. 9, to connect the cap 20 to the cellular flip telephone.

Figure 7A:
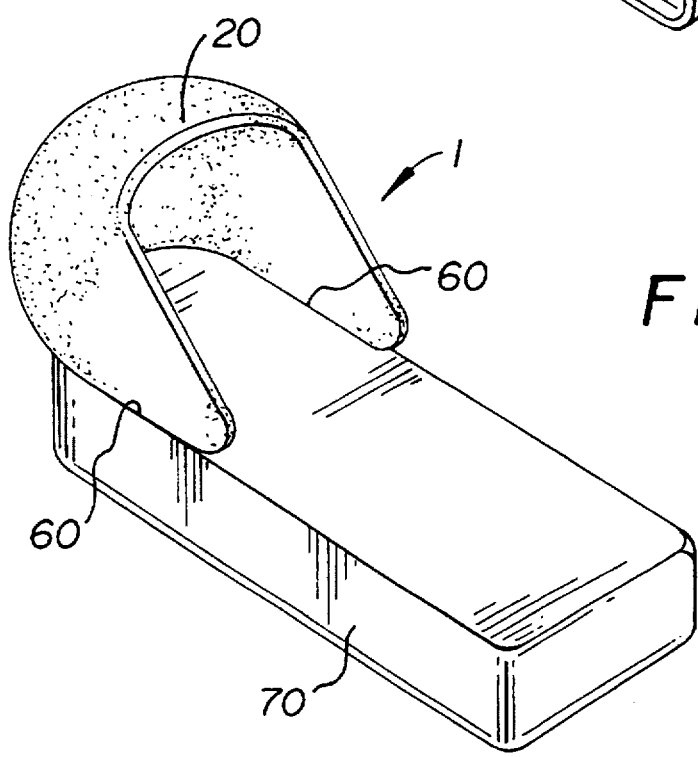
FIG. 7a is a perspective view of an extender attached to the voice reflector.

FIG. 7a illustrates an extender 70 attached to the voice reflector 1. The preferred embodiment of the extender has an opening formed on one end. An end of the cellular telephone 2 proximal the microphone protrudes into the opening of the extender 70. Additionally, the lower edges of the cap 20 are connected to the extender 70. This embodiment ensures the voice reflector 1 is positioned proximal to a speaker's mouth even when the cellular telephone 2 is so short that the voice reflector 1 would otherwise be next to the speaker's cheek.

Figure 8:
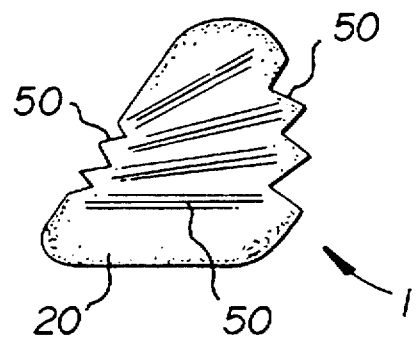
FIG. 8 is a side-elevational view of a sixth embodiment of the voice reflector.

A sixth embodiment of the voice reflector 1 is illustrated in FIG. 8. The cap 20 has creases 50 formed therein. The creases 50 permit the cap 20 to fold up like an accordion so that the cellular telephone 2 may more easily be put in a pocket or purse with the voice reflector 1 attached.

FIG. 9 illustrates a seventh embodiment of the voice reflector 1 attached to a cellular flip telephone 2. The cellular flip telephone 2 has a microphone 3 and a lid 4.

Sound waves of a voice are directed towards an inoperable microphone 5. The voice reflector 1 of this embodiment includes a jalousie with a plurality of baffles 10 attached to the lid 4 of the cellular flip telephone 2 in order to redirect the sound waves towards the operable microphone 3. In one preferred embodiment, the baffles 10 are attached to the lid 4 with hinges so that the lid 4 can close when the baffles 10 are parallel to the lid 4. In another preferred embodiment, the baffles 10 are made of a flexible material such as rubber, polyurethane, etc. The jalousie may be connected to the lid 4, for example, with an elastic pocket as described above with respect to FIG. 7.

I claim:

1. In combination with a cellular telephone having a microphone, a voice reflector, comprising:

a cap attached to the cellular telephone, said cap having an inner surface defining means for reflecting sound waves into the microphone of the cellular telephone, and said cap at least partly enclosing the microphone when in an operating position;

said cap being formed of a flexible material; and said cap having a plurality of creases formed therein for folding said cap into itself when the cellular telephone is in storage.

2. The voice reflector according to claim 1, wherein said inner surface of said cap is concave.

3. The voice reflector according to claim 1, wherein the cellular telephone has lateral surfaces and said cap includes two wings attached to the lateral surfaces of the cellular telephone.

4. The voice reflector according to claim 1, wherein said cap is integrally connected to the cellular telephone.

5. The voice reflector according to claim 1, including fasteners disposed on said inner surface of said cap for connecting said cap to the cellular telephone.

6. The voice reflector according to claim 5, wherein said fasteners are hook and loop fasteners.

7. The voice reflector according to claim 5, wherein said fasteners are adhesive tape.

8. The voice reflector according to claim 5, wherein the cellular telephone has lateral surfaces with grooves formed therein, said fasteners being tongues engaging in the grooves formed in the cellular telephone.

9. The voice reflector according to claim 5, wherein the cellular telephone has lateral surfaces with bores formed therein, said fasteners being hinges engaging with the bores formed in the cellular telephone.

10. The voice reflector according to claim 1, wherein the cellular telephone has an end proximal the microphone, said cap has lower edges, and including a pocket connected to said lower edges of said cap, the end of the cellular telephone protruding into said pocket.

11. The voice reflector according to claim 9, wherein said pocket has an opening formed therein corresponding to the microphone of the cellular telephone for exposing the microphone to enhance transmission quality.

12. The voice reflector according to claim 1, wherein the cellular telephone has an end proximal the microphone, said cap has lower edges, and including an extender connected to said lower edges of said cap for positioning said cap proximal to a mouth of an operator, the end of the cellular telephone attaching to said extender.

13. The voice reflector according to claim 1, wherein the cellular telephone is a cellular flip telephone.

14. In combination with a communication device having a microphone, a voice reflector, comprising:

a cap formed of a flexible material attached to the communication device, said cap having an inner surface defining means for reflecting sound waves of a voice into the microphone of the communication device; and said cap having a plurality of creases formed therein for folding said cap into itself when the communication device is in storage.

15. In combination with a cellular flip telephone having a microphone and a lid, a voice reflector, comprising:

a jalousie attached to the lid of the cellular flip telephone for reflecting sound waves of a voice into the microphone of the cellular telephone.

16. The voice reflector according to claim 15, wherein said jalousie includes a plurality of baffles hingedly attached to the lid of the cellular flip telephone.

17. The voice reflector according to claim 15, wherein said jalousie includes a plurality of flexible baffles attached to the lid of the cellular flip telephone.

* * * * *

UNITED STATES PATENT AND TRADEMARK OFFICE
CERTIFICATE OF CORRECTION

PATENT NO : 5,778,062
DATED : July 7, 1998
INVENTOR(S): Arthur Vanmoor

It is certified that error appears in the above-identified patent and that said Letters Patent is hereby corrected as shown below:

On title page,
Item [30] should read as follows:

Oct. 10, 1995   [NL]   Netherlands ..... 1001382

Item [76] should read as follows:

Arthur Vanmoor, 153 E. Palmetto Park Road, Suite 219, Boca Raton, Fla. 33432

Signed and Sealed this

Twenty-ninth Day of December, 1998

BRUCE LEHMAN

*Attest:*

*Attesting Officer*   *Commissioner of Patents and Trademarks*